United States Patent
Sane et al.

(10) Patent No.: US 9,798,007 B2
(45) Date of Patent: Oct. 24, 2017

(54) OBSTACLE DATA MODEL CONSTRUCTION SYSTEM WITH RANGE SENSOR SHADOWS AND USE IN MOTION PLANNING

(71) Applicant: Sikorsky Aircraft Corporation, Stratford, CT (US)

(72) Inventors: Harshad S. Sane, Southbury, CT (US); Thomas A. Frewen, West Hartford, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 296 days.

(21) Appl. No.: 14/755,784

(22) Filed: Jun. 30, 2015

(65) Prior Publication Data

US 2016/0216377 A1    Jul. 28, 2016

Related U.S. Application Data

(60) Provisional application No. 62/019,607, filed on Jul. 1, 2014.

(51) Int. Cl.
*G01S 17/93* (2006.01)
*G01S 7/48* (2006.01)
(Continued)

(52) U.S. Cl.
CPC ............ *G01S 17/933* (2013.01); *G01C 21/20* (2013.01); *G01S 7/4808* (2013.01); *G01S 7/4817* (2013.01); *G01S 17/026* (2013.01)

(58) Field of Classification Search
CPC ..... G01C 21/20; G01S 7/4817; G01S 7/4808; G01S 17/933; G01S 17/026
(Continued)

(56) References Cited

U.S. PATENT DOCUMENTS 5,831,724 A * 11/1998 Cordes ...................... F41G 3/04
356/141.1
6,122,572 A * 9/2000 Yavnai ................. G05D 1/0088
342/13
(Continued)

FOREIGN PATENT DOCUMENTS

DE      10 2007 013 023 A1     9/2008

OTHER PUBLICATIONS

Translation of description of DE 10 2007 013023, with translations of cited paragraphs highlighted, created Jun. 18, 2017, 22 pages.*

(Continued)

*Primary Examiner* — Daniel L Murphy
(74) *Attorney, Agent, or Firm* — Cantor Colburn LLP

(57) ABSTRACT

A method of operating an obstacle data model construction system of an aircraft is provided. With a vehicle moving through a vehicle obstacle space from a first to a second position, the method includes scanning the vehicle obstacle space at the first and second positions, generating first and second boundary data sets from results of the scanning at the first and second positions, respectively, and deriving first and second shrouded regions from the first and second boundary data sets, respectively. The method further includes identifying a high confidence occupancy region from intersecting portions of the first and second shrouded regions or identifying an occupancy region from a union of the first and second shrouded regions.

13 Claims, 4 Drawing Sheets

(51) Int. Cl.
*G01C 21/20* (2006.01)
*G01S 7/481* (2006.01)
*G01S 17/02* (2006.01)

(58) Field of Classification Search
USPC .......................................................... 356/4.01
See application file for complete search history.

(56) References Cited

U.S. PATENT DOCUMENTS

| | | |
|---|---|---|
| 7,974,460 B2 | 7/2011 | Elgersma |
| 8,022,951 B2 | 9/2011 | Zhirkov |
| 8,050,863 B2 | 11/2011 | Trepagnier |
| 8,130,367 B2 | 3/2012 | Stettner |
| 8,260,539 B2 | 9/2012 | Zeng |
| 8,315,789 B2 | 11/2012 | Dunbabin |
| 2010/0053593 A1 | 3/2010 | Bedros |
| 2012/0046820 A1 | 2/2012 | Allard |
| 2012/0182392 A1 | 7/2012 | Kearns |
| 2013/0226344 A1 | 8/2013 | Wong |

OTHER PUBLICATIONS

Besl et al., "A Method for Registration of 3-D Shapes", IEEE Transactions on Pattern Analysis and Machine Intelligence, Feb. 1992, pp. 239-256, vol. 14, No. 2.
Hoseinnezhad et al., "P2-40: Sensor for Ultrasonic and Laser Arrays in Mobile Robotics: A Comparative Study of Fuzzy, Dempster and Bayesian Approaches", Proceedings of IEEE Sensors, Jun. 2002, pp. 1682-1689, vol. 2.
Extended European Search Report issued on Nov. 20, 2015 in corresponding EP Patent Application No. 15174719.3.

\* cited by examiner

OBSTACLE DATA MODEL CONSTRUCTION SYSTEM WITH RANGE SENSOR SHADOWS AND USE IN MOTION PLANNING

CROSS REFERENCE TO RELATED APPLICATION

This application is a Non-Provisional of U.S. Provisional Application No. 62/019,607 filed Jul. 1, 2014 the disclosures of which are incorporated by reference herein in its entirety.

BACKGROUND OF THE INVENTION

The subject matter disclosed herein relates to an obstacle data model construction system and, more particularly, the use of an obstacle data model construction system with range sensor shadows in motion planning.

Light-based range sensors operate by returning the range of a reflecting surface they "shine" on. The returned ranges can then be used in the construction of a surface of the exposed object by sensor hits being stored in a world-model database and cleaving to an occupancy grid representing space occupied by the exposed surface.

The occupancy grid and the hits do not normally capture a rigidity of the underlying surface. As such, a corresponding flight planner can use only surface information as a way to define an obstacle space and could compute a plan that avoids the surface but nevertheless goes into and through solid obstacles. Although, subsequent exposure of an object may eventually resolve its solidity, the need for subsequent exposures may lead to inefficient planning or late avoidance reactivity.

BRIEF DESCRIPTION OF THE INVENTION

According to one aspect of the invention, a method of operating an obstacle data model construction system of an aircraft is provided. The method includes, with a vehicle moving through a vehicle obstacle space from a first to a second position, scanning the vehicle obstacle space at the first and second positions, generating first and second boundary data sets from results of the scanning at the first and second positions, respectively, deriving first and second shrouded regions from the first and second boundary data sets, respectively, and identifying a high confidence occupancy region from intersecting portions of the first and second shrouded regions.

In accordance with additional or alternative embodiments, the scanning includes conical scanning ahead of the vehicle, a cone-shape of the conical scanning being defined by a field of view of a light detection and ranging (LIDAR) sensor.

In accordance with additional or alternative embodiments, the scanning is executed at the first and second positions and at additional positions, wherein the deriving and identifying employ the results of the scanning at the first and second positions and results of the scanning at the additional positions.

In accordance with additional or alternative embodiments, the deriving includes assuming that an obstacle exists behind boundaries, which are respectively represented by the first and second boundary data sets, relative to a location of the vehicle at the first and second positions.

In accordance with additional or alternative embodiments, the first and second shrouded regions are movable within the vehicle obstacle space and the deriving includes introducing a decay factor modifying the first and second boundary data sets In accordance with additional or alternative embodiments, wherein the method further includes adjusting a mission plan to avoid the high confidence occupancy region.

In accordance with additional or alternative embodiments, wherein the adjusting includes constructing a roadmap for the vehicle.

In accordance with additional or alternative embodiments, wherein the method further includes limiting additional scanning in the high confidence region.

According to one aspect of the invention, a method of operating an obstacle data model construction system of an aircraft is provided. The method includes, with a vehicle moving through a vehicle obstacle space, scanning the vehicle obstacle space at multiple positions, generating boundary data sets from results of the scanning at each of the multiple positions, respectively, deriving shrouded regions from the boundary data sets, respectively, and identifying an occupancy region from a union of the shrouded regions.

In accordance with additional or alternative embodiments, the scanning includes conical scanning ahead of the vehicle, a cone-shape of the conical scanning being defined by a field of view of a light detection and ranging (LIDAR) sensor.

In accordance with additional or alternative embodiments, the deriving includes assuming that an obstacle exists behind boundaries, which are respectively represented by the boundary data sets, relative to a location of the vehicle at the multiple positions.

In accordance with additional or alternative embodiments, the shrouded regions are movable within the vehicle obstacle space in accordance with movement of an associated obstacle and the deriving includes introducing a decay factor modifying the boundary data sets.

In accordance with additional or alternative embodiments, wherein the method further includes adjusting a mission plan to avoid the occupancy region.

In accordance with additional or alternative embodiments, wherein the adjusting includes constructing a roadmap for the vehicle.

In accordance with additional or alternative embodiments, the method further includes limiting additional scanning in the occupancy region.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a method of using "sensor shadows" as a way to estimate an extent of an obstacle in a vehicle obstacle space is provided.

Figure 1:
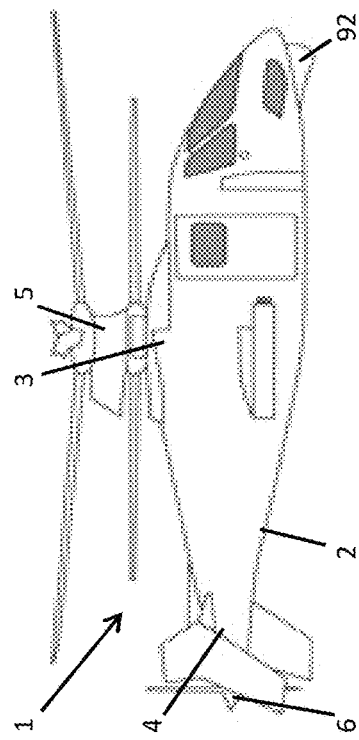
FIG. 1 is a schematic illustration of an aircraft in accordance with embodiments.
Figure 2:
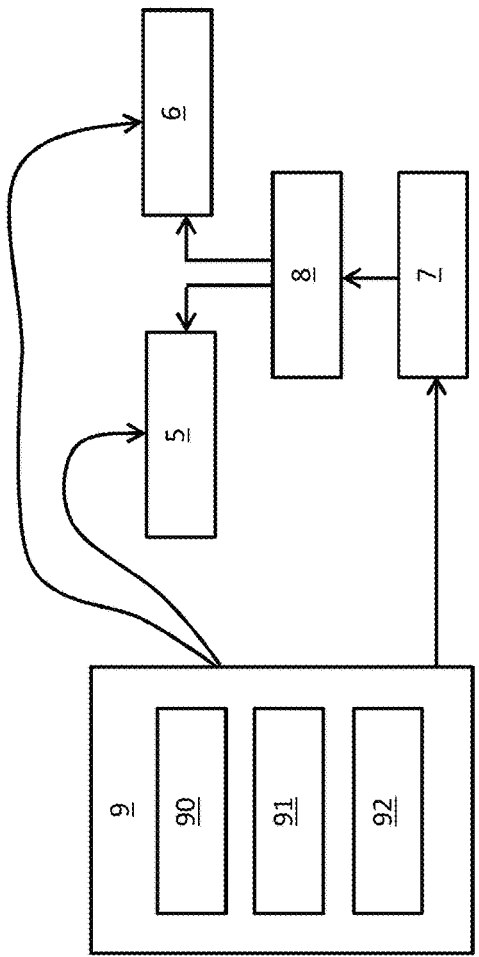
FIG. 2 is a schematic illustration of components of the aircraft of FIG. 1.
Figure 3:
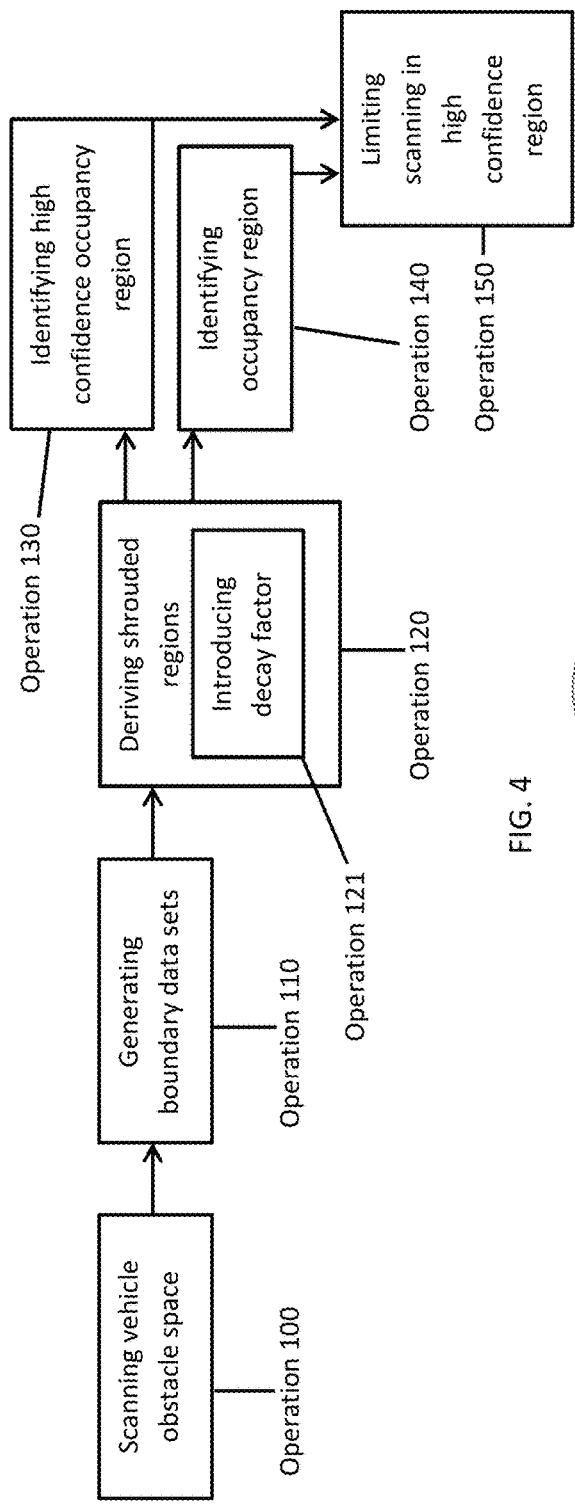
FIG. 3 is a flow diagram illustrating a method of operating an obstacle data model construction system in accordance with embodiments.
Figure 4:
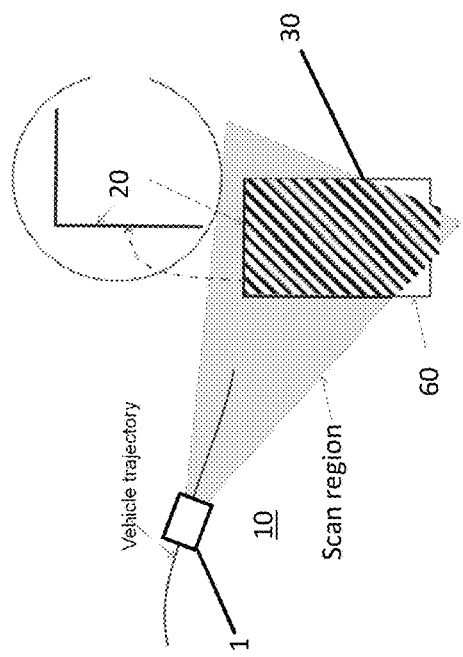
FIG. 4 is diagram of an operation of an obstacle data model construction system in accordance with embodiments.

With reference to FIGS. 1 and 2, a vehicle such as a ground-based vehicle or an aircraft 1 is provided. In the case of the vehicle being an aircraft 1, the aircraft 1 includes an airframe 2, which may be formed to define a cabin that can accommodate a pilot and at least one or more crewmen or passengers and has an upper portion 3 and a tail portion 4. A main rotor apparatus 5 is operably disposed at the upper portion 3 and a tail rotor apparatus 6 is operably disposed at the tail portion 4. The main rotor apparatus 5 may be provided as a single rotor or at coaxial counter-rotating rotors. The tail rotor apparatus 6 may be provided as a tail rotor or a propeller. In either case, operations of the main rotor apparatus 5 and the tail rotor apparatus 6 relative to the airframe 2 drive mission operations of the aircraft 1.

As shown in FIG. 2, the airframe 2 is further formed to encompass an engine 7, a transmission 8 and a mission computer 9, which is operably coupled to the main rotor apparatus 5, the tail rotor apparatus 6, the engine 7 and the transmission 8. In accordance with commands issued by the mission computer 9, the engine 7 drives the operations of the main rotor apparatus 5 and the tail rotor apparatus 6 via the transmission 8 for mission control and navigation purposes. The mission computer 9 additionally issues collective and cyclic servo commands to the main rotor apparatus 6 and the tail rotor apparatus 6 to provide for additional mission controls and navigation.

The mission computer 9 includes a memory unit 90, a processor unit 91 and a sensor system 92. The sensor system 92 may be provided as a light detection and ranging (LIDAR) system or as another range sensing system and may be disposed at various points on the airframe 2 and senses various characteristics of a vehicle obstacle space surrounding the aircraft 1. The processor unit 91 receives information from the sensor system 92 and analyzes that information in accordance with executable instructions stored on the memory unit 90. The information and analysis will be described in greater detail below.

Although illustrated in FIGS. 1 and 2 as a piloted helicopter, it is to be understood that this is merely exemplary and that the aircraft 1 can be any type of ground- or air-based vehicle and can be manned, unmanned or remotely piloted.

With reference to FIGS. 3-6 and, in accordance with an aspect, a method of operating an obstacle data model construction system of the aircraft 1 described above is provided. With a vehicle, such as the aircraft 1, moving through a vehicle obstacle space 10 from a first position 11 to a second position 12 and then to third and fourth sequential positions 13 and 14, the method includes scanning the vehicle obstacle space 10 at least at the first position 11 and the second positions 12 (operation 100). The method further includes generating at least first and second boundary data sets (see boundary data 20 in FIG. 4) from results of the scanning at the first position 11 and the second position 12, respectively (operation 110), and deriving at least first and second shrouded regions (see shrouded regions 30 in FIGS. 4 and 6) from the first and second boundary data sets, respectively (operation 120).

The generation of the first and second boundary data sets is made possible when the scanning shines light on an obstacle (see the obstacle rectangle in FIGS. 4 and 6) in the vehicle obstacle space 10. This obstacle reflects light back toward the aircraft 1 whereupon the sensor system 92 builds a data set that is representative of the reflective surface of the obstacle. This data set is used to then generate the boundary data sets of operation 110. Once the boundary data sets are generated, the deriving of operation 120 proceeds and includes assuming that an obstacle 60 exists behind boundaries, which may be manifested as grid lines generated on a graphical user interface or display. For the scanning at the first and second positions 11 and 12, the boundaries would be respectively represented by the first and second boundary data sets, relative to a location of the vehicle at the first and second positions 11 and 12.

Figure 5:
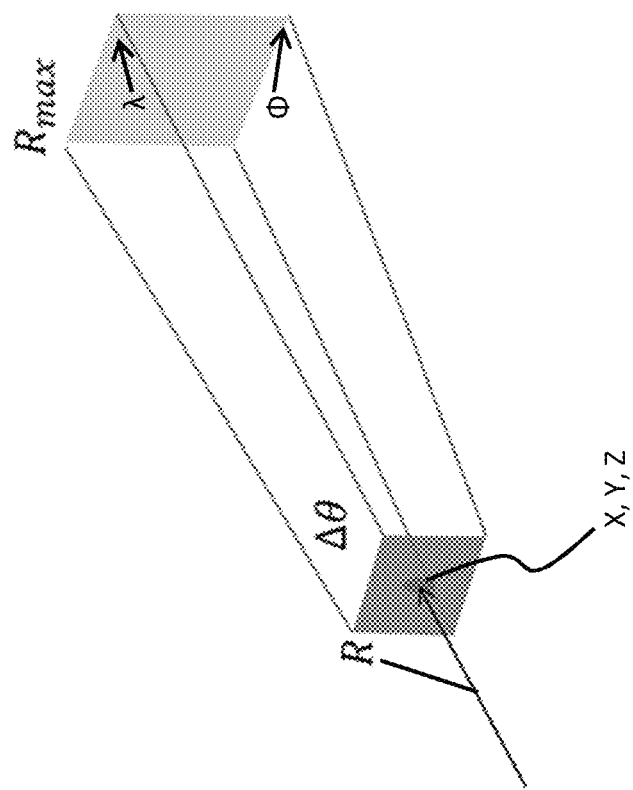
FIG. 5 is a graphical depiction of a LIDAR cone in accordance with embodiments.

More particularly and with reference to FIG. 5, in a case where the sensor system 92 is provided as a LIDAR system, a LIDAR registered hit may occur at an inertial location (X, Y, Z) with range R and at an incident direction shown by inclination angles ($\lambda$, $\phi$) and a maximum LIDAR detection range of R_max. In such a case, a LIDAR subcone may be defined with a registered point shown with a "tile" at range R of size R$\Delta\theta$ assuming a LIDAR beam dispersion of $\Delta\theta$. This tile casts a shadow volume behind until the LIDAR range R_max. Given a series of scan points (within a single LIDAR scan), a series on non-intersecting shadow sub-cones can be generated and combined together to form a single shadow volume per scan. For each subsequent scan, a new shadow volume may be generated and intersected with the previous shadow region(s). The intersections would provide a volume of high-confidence that an obstacle exists. The union of shadow regions minus the intersections, would be regions of lower confidence and can be decayed in probability with time.

With the above in mind, intersections of subsequent shadow volumes $C^+$ from a series of LIDAR scans provide for a shadow volume region that has a higher confidence of being occupied. Alternatively, the union of all sensor shadows minus $C^+$, which is represented by $C^-$ below, can be included as a region where the confidence of occupancy is lower and may decay at an appropriate "forgetting" rate. Thus, the following is true.

$C_{ij}$ is the ith sub-cone in the jth LIDAR scan.

$C_j = \cup C_{ij}$ is shadow region, i.e. the union of all sub-cones in the jth LIDAR scan.

$C^+ = \cap C_j$ is the intersection of all shadow regions (which grows confidence)

$C^- = \cup C_j - \cap C_j$ is the intersection of all shadow (which may decay in confidence In case the region is represented in the form of a grid, the grid cells that fall within the current sensor scanning range, but do not fall under the current sensor shadow volume, can be reduced in confidence by a higher "forgetting rate," such as $\Delta P_{delete}$. The grid cells that do not fall within the current sensor scanning range, can be reduced in confidence by a lower "forgetting rate" $\Delta P_{forget}$. The grid cells that fall within the current sensor scanning range and fall under the $C^+$ are incremented in confidence by $\Delta P_{increase}$. Here, the "forgetting rate" is a decrement value in the probability of occupancy applied after each scan. A representation of the cell probability update can therefore be:

$$P(\text{cell } i, \text{scan } k) =$$
$$P(\text{cell } i, \text{time } k-1) + \begin{cases} -\Delta P_{delete} & \text{if cell is in Scan}(k) \,\&\, C^- \\ +\Delta P_{increase} & \text{if cell is in Scan}(k) \,\&\, C^+ \\ -\Delta P_{forget} & \text{if cell is not in Scan}(k) \text{ or } C^- \end{cases}$$

Of course, P(cell i, scan k) is bound below by zero and bounded above by 1. So the update law works within these limits.

In accordance with embodiments, in order to register a shadow region in a world model, the shadow region can be represented by a polytope (polygonal volume) or can be broken down into 3D grid cells and registered into a grid or octree data base. The grid approach may be easier to implement and intersect, update and re-compute than the polygonal shape approach but requires more memory space than the polygonal shape approach. In accordance with further embodiments, LIDAR points that are closely registered can be attributed to a common line or surface and surface-identification algorithms can in real-time construct these surfaces based on streamed LIDAR data (see again boundary data 20 in FIG. 4). These algorithms can reject outliers, fill gaps and construct a tight estimate of the surface. This tight surface estimate can result in a tighter estimate of the shadow region for a particular scan.

Subsequently, the method includes either identifying a high confidence occupancy region (see sequential high confidence occupancy regions 41, 42 and 43 in FIG. 6 with highest confidence occupancy region being region 43) from intersecting portions of the first and second shrouded regions (operation 130) or conservatively identifying an occupancy region (see occupancy region 50 in FIG. 6) from the union of the first and second shrouded regions (operation 140).

Especially in the case of the vehicle being the aircraft 1 or some other type of helicopter or aircraft, the scanning of operation 100 may be performed by the sensor system 92. In such cases, the sensor system 92 may be disposed at a front and/or rear end of the airframe 2. The scanning of operation 100 may be performed as conical scanning operations of the vehicle obstacle space 10 in three dimensions, where a cone-shape of the conical scanning may be defined by a field of view of a LIDAR sensor. Conversely, where the vehicle is a ground based vehicle, such as a car, the scanning of operation 100 may be performed as cone-shaped scanning operations in two dimensions.

In accordance with embodiments, although the scanning of operation 100 is described above with respect to the first and second positions 11 and 12 specifically, it is to be understood that the scanning of operation 100 may be conducted or performed at multiple additional positions. In such cases, the generating, deriving and identifying operations relate to and use the results of the scanning performed at the first and second positions 11 and 12 as well as the scanning performed at the multiple additional positions. This additional scanning and subsequent computation requires additional computing resources but may tend to increase an overall accuracy of the identified high confidence occupancy or occupancy region by virtue of additional data points being available for the computations.

In accordance with further embodiments, it will be understood that any obstacle associated with a high confidence occupancy region or an occupancy region in the vehicle space 10 may be moving relative to the aircraft 1 or that the aircraft 1 is simply moving relative to the obstacle/occupancy region in the vehicle space 10. In such cases, the first and second shrouded regions 30 may be movable within the vehicle obstacle space 10 in accordance with the relative movement of the obstacle with respect to the aircraft 1, and the deriving of operation 120 includes introducing a time-based forgetting or decay factor into the computations used in the identifying of operations 130 and 140 (operation 121). This decay factor would modify the first and second boundary data sets and weigh earlier derived shrouded regions less than later derived shrouded regions in the identifying of operations 130 and 140.

The obstacle data model construction system described above may be employed to adjust a mission plan of the aircraft 1 during in-mission operations in order to avoid the high confidence occupancy regions 41, 42 and 43. Such employment may be conservative in that the adjustment can be a substantial re-direction of the aircraft 1 and/or in that the adjustment can be based on a avoiding a singularly derived shrouded region 30 (see FIG. 4) or a relatively low level high confidence region such as high confidence region 41 of FIG. 6. In any case, the adjustment of the mission plan may include construction of a roadmap 70 for the aircraft 1 that avoids the identified obstacle 60.

In accordance with further embodiments, the method may further include limiting additional scanning within a high confidence region 41, 42 and 43 (operation 150) in order to reduce computing resource and computational requirements.

Figure 6:
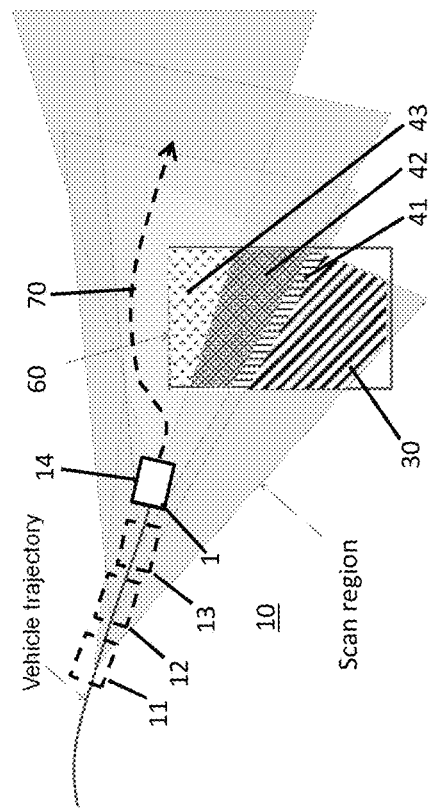
FIG. 6 is a flow diagram of an operation of an obstacle data model construction system with range sensor shadows for use in motion planning in accordance with embodiments.

For a particular mission instance for a vehicle, as shown in FIG. 6, aircraft 1 may proceed through vehicle obstacle space 10 and the mission computer 9 will cause the sensor system 92 to begin scanning the vehicle obstacle space 10. In an event that obstacle 60 (i.e., a building) exists in the vehicle obstacle space 10, the sensor system 92 will shine on the obstacle 60 and the surface of the obstacle 60 will reflect light back toward the aircraft 1. This reflected light will be sensed by the sensor system 92 with the aircraft at position 11 and the processing unit 91 will generate a boundary data set that is reflective of the obstacle 60 surface. The processing unit 91 will then assume that an obstacle exists behind the boundary data set in deriving a shrouded region. As the aircraft proceeds through positions 12, 13 and 14, this process will repeat until the high confidence occupancy regions 41, 42 and 43 are generated in areas where the shrouded regions intersect or overlap.

Once the processing unit 91 identifies the shrouded regions and the high confidence occupancy regions 41, 42 and 43, the processing unit 91 will determine whether the mission plan of the aircraft 1 needs to be adjusted in order to avoid the obstacle 60. This determination may be executed conservatively to the extent possible to reduce the likelihood of an error. In addition, the processing unit 91 may limit additional scanning of the shrouded regions and the high confidence occupancy regions 41, 42 and 43 in order to reduce computing resource and computational requirements.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operating an obstacle data model construction system, comprising:
   with a vehicle moving through a vehicle obstacle space from a first to a second position, scanning the vehicle obstacle space at the first and second positions;
   generating first and second boundary data sets from results of the scanning at the first and second positions, respectively;
   deriving first and second shrouded regions from the first and second boundary data sets, respectively;
   identifying a high confidence occupancy region from intersecting portions of the first and second shrouded regions; and
   limiting additional scanning in the high confidence occupancy region.

2. The method according to claim 1, wherein the scanning comprises conical scanning ahead of the vehicle, a cone-shape of the conical scanning being defined by a field of view of a light detection and ranging (LIDAR) sensor.

3. The method according to claim 1, wherein the scanning is executed at the first and second positions and at additional positions, wherein the deriving and identifying employ the results of the scanning at the first and second positions and results of the scanning at the additional positions.

4. The method according to claim 1, wherein the deriving comprises assuming that an obstacle exists behind boundaries, which are respectively represented by the first and second boundary data sets, relative to a location of the vehicle at the first and second positions.

5. The method according to claim 1, wherein the first and second shrouded regions are movable within the vehicle obstacle space and the deriving comprises introducing a decay factor modifying the first and second boundary data sets.

6. The method according to claim 1, further comprising adjusting a mission plan to avoid the high confidence occupancy region.

7. The method according to claim 6, wherein the adjusting comprises constructing a roadmap for the vehicle.

8. A method of operating an obstacle data model construction system of an aircraft, comprising:
   with a vehicle moving through a vehicle obstacle space, scanning the vehicle obstacle space at multiple positions;
   generating boundary data sets from results of the scanning at each of the multiple positions, respectively;
   deriving shrouded regions from the boundary data sets, respectively;
   identifying an occupancy region from a union of the shrouded regions; and
   limiting additional scanning in the occupancy region.

9. The method according to claim 8, wherein the scanning comprises conical scanning ahead of the vehicle, a cone-shape of the conical scanning being defined by a field of view of a light detection and ranging (LIDAR) sensor.

10. The method according to claim 8, wherein the deriving comprises assuming that an obstacle exists behind boundaries, which are respectively represented by the boundary data sets, relative to a location of the vehicle at the multiple positions.

11. The method according to claim 8, wherein the shrouded regions are movable within the vehicle obstacle space in accordance with movement of an associated obstacle and the deriving comprises introducing a decay factor modifying the boundary data sets.

12. The method according to claim 8, further comprising adjusting a mission plan to avoid the occupancy region.

13. The method according to claim 8, wherein the adjusting comprises constructing a roadmap for the vehicle.

* * * * *